United States Patent [19]

Hamilton

[11] Patent Number: 5,034,474

[45] Date of Patent: Jul. 23, 1991

[54] FLAME RETARDANT AROMATIC POLYESTER MOLDING COMPOSITIONS HAVING REDUCED DRIPPING TENDENCIES UPON BURNING

[75] Inventor: Douglas G. Hamilton, Guilderland, N.Y.

[73] Assignee: General Electric Company, Schenectady, N.Y.

[21] Appl. No.: 448,448

[22] Filed: Dec. 11, 1989

[51] Int. Cl.$^5$ .............................................. C08L 83/05
[52] U.S. Cl. .................................... 525/446; 524/413; 525/474
[58] Field of Search ................. 525/474, 446; 524/413

[56] References Cited

U.S. PATENT DOCUMENTS

| | | |
|---|---|---|
| 3,251,794 | 5/1966 | Paliyenko et al. .................. 525/474 |
| 3,541,127 | 11/1970 | Beattie et al. ........................ 525/474 |
| 3,971,756 | 7/1976 | Bialous et al. ....................... 524/409 |
| 4,265,801 | 5/1981 | Moody et al. ....................... 525/446 |
| 4,294,938 | 10/1981 | Berr et al. ............................. 525/446 |
| 4,344,878 | 8/1982 | Dolce ................................... 524/611 |
| 4,399,064 | 8/1983 | Penneck .............................. 524/413 |
| 4,450,266 | 5/1984 | Idel et al. ............................. 525/474 |
| 4,548,979 | 10/1985 | Weise et al. ......................... 524/413 |

FOREIGN PATENT DOCUMENTS 62-151451 7/1987 Japan.

Primary Examiner—Veronica P. Hoke
Attorney, Agent, or Firm—William A. Teoli; James C. Davis, Jr.; William H. Pittman

[57] ABSTRACT

Aromatic polyesters, such as polybutylene-terephthalate, have been found to have a reduced tendency to drip during burning, if an effective amount of a polyhydroorganosiloxane is incorporated into the polyester. A further enhancement in the non-drip behavior is achieved by the addition of an effective amount of a transition metal oxide, such as a platinum oxide, or by the modification of the polyhydroorganosiloxane with an aliphatic alcohol such as benzyl alcohol in the presence of a catalytic amount of an alkali metal alkoxide.

5 Claims, No Drawings

FLAME RETARDANT AROMATIC POLYESTER MOLDING COMPOSITIONS HAVING REDUCED DRIPPING TENDENCIES UPON BURNING

BACKGROUND OF THE INVENTION

The present invention relates to aromatic polyester compositions having a reduced tendency to drip upon burning. More particularly, the present invention relates to the incorporation of a polyhydroorganosiloxane into a polyalkylene terephthalate to provide for the production of a thermoplastic aromatic polyester molding composition exhibiting reduced tendency to drip upon burning.

Prior to the present invention, linear aromatic polyesters, such as poly(1,4-butylene terephthalate) resins, have been recognized as valuable injection moldable thermoplastics. Although these aromatic polyesters have been found to be useful in many applications, these polymers have a tendency to readily burn when ignited. In addition, aromatic polyesters have a tendency to drip when burning which can create flaming droplets of polymer and rapidly propagate fires. Abolins, U.S. Pat. No. 3,671,487, shows that the combination of glass re-enforcement, a flame retardant additive and polytetrachloroethylene resin can be used to overcome the flammable nature of linear polyester resin.

It was further found by Dolce, U.S. Pat. No. 4,344,878, that the flammability and dripping tendencies of burning linear polyesters, such as high molecular weight polymers of terephthalic acid and isophthalic acid could be retarded if a minor amount of polytetrafluoroethylene resin were employed in combination with a flame retardant additive.

Although improvements in the flame retardance and non-drip properties of aromatic polyesters have been achieved by the prior art, it has been found that the presence of halogenated flame retardants and non-drip additives in aromatic polyester often can result in production of deleterious by-products when the aromatic polyester is burned. Considerable effort therefore has been made by the thermoplastic industry to develop non-halogenated additives for aromatic polyesters to improve the ability of such polymers to resist rapid propagation of fire upon burning.

SUMMARY OF THE INVENTION

The present invention is based on my discovery that aromatic polyesters, such as high molecular weight polymers and copolymers of terephthalic and isophthalic acid can be blended with an effective amount of a polyhydroorganosiloxane, such as a polyhydromethylsiloxane fluid to produce a thermoplastic molding composition exhibiting a significant reduction in the tendency to drip upon burning. It has been further found that the incorporation into aromatic polyester, of polyhydroorganosiloxane which has been reacted with an aliphatic alcohol in the presence of an alkali alkoxide catalyst, can achieve an additional enhancement in the non-drip properties of the aromatic polyester upon burning. A transition metal oxide, such as platinum oxide, also has been found effective to further enhance the non-drip characteristics the of aromatic polyesters when undergoing combustion when used in combination with the polyhydroorganosiloxane.

STATEMENT OF THE INVENTION

There is provided by the present invention, thermoplastic molding compositions exhibiting enhanced non-drip properties upon burning, which consists essentially of (a) a linear aromatic polyester and,
(b) an effective amount of a non-drip additive selected from the class consisting of,
  (i) polyhydroorganosiloxane
  (ii) the product of reaction of the polyhydroorganosilxane of (i) and 0.1% to 50% by weight based on the weight of (i) of an aliphatic alcohol, in the presence of an alkali metal alkoxide catalyst, and
  (iii) a blend of the polyhydroorganosiloxane of (i) and $1 \times 10^{-4}\%$ to 10% by weight of the blend of a transition metal oxide.

The linear polyesters which can be used in the present invention can be selected from polymeric glycol terephthalate and isophthalate esters having repeat groups of the formula:

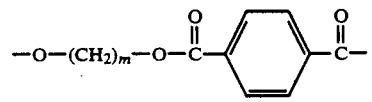

wherein m is a whole number of from 2 to 4, and mixtures of such esters.

Although poly(1,4-butylene terephthalate) is preferred, branched copolyesters also can be used. These copolyesters can be branched either by crosslinking through chemical linkages or by other known methods. They can contain minor amounts of e.g., from 0.5 to 15 mole percent of the total of 1,4-butylene units, of other aliphatic linkages, e.g., those of from 2 to 10 carbon atoms, such as dimethylene, trimethylene, hexamethylene, decamethylene and the like linkages, as well as cycloaliphatic, e.g., 1,4-dimethylene-cyclohexane linkages. In addition to the terephthalic acid units other dicarboxylic acid units such as adipic, naphthalene dicarboxylic, isophthalic and orthophthalic units can be present in small amounts, e.g., from about 0.5 to about 15 mole percent of the total acid units.

Especially useful are branched high melt viscosity poly(1,4-butylene terephthalate) resins, which include a small amount of a branching component containing at least three ester forming components. The branching component may be one which provides branching in the acid unit portion of the polyester, or in the glycol unit portion, or it may be a hybrid. Illustrative of such branching components are tri- or tetracarboxylic acids, such as trimesic acid, pyromellitic acid and lower alkyl esters thereof, and the like, or preferably, polyols, and especially preferably, tetrols such as trimethylolpropane; or dihydroxy carboxylic acid and hydroxydicarboxylic acid and derivatives, such as hydroxyterephthalic acid. Treatment with triglycidyl isocyanurate (TGIC) also can be used.

The relative amount of branching component may vary, but it is always kept at a minor proportion, e.g., of up to 5 mole percent maximum, for every 100 moles of the terephthalate units in the branched polyester. Preferably, the range of branching component included in the esterification mixture (and generally that included in the product) will be from 0.01 to 3 mole percent based on the terephthalate units. Especially preferably, it will comprise from about 0.02 to about 1 mole percent, based on the terephthalate component.

Polyhydroorganosiloxanes which can be used in the practice of the present invention are for example, siloxane hydride having the formula,

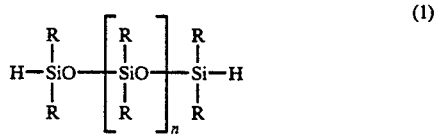

(1)

where R is selected from $C_{(1-13)}$ monovalent organic radicals free of olefinic unsaturation and n is an integer having a value sufficient to provide a viscosity of 1 to 500 centipoises at 25°) C. and from about 1 to 40 mole percent of chainstopping diorganohydride siloxy units, based on the total moles of chemically combined siloxy units in the polyhydroorganosiloxane.

In addition to the polyhydroorganosiloxane of formula (1), there also can be used in the present invention polyhydroorganosiloxane resins consisting essentially of the following chainstopping unit,

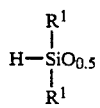

condensed with silicate ($SiO_2$) units, where the $R^1+H$ to Si ratio can vary from 1.0 to 2.7. A discussion of silicone resins is shown in Rochow Chemistry of the Silicones, pp. 90–94, Second Edition, John Wiley and Sons, New York, 1951, which is incorporated herein by reference. Siloxane hydride resins also can have the above condensed chainstopping units chemically combined with $SiO_2$ units and $(R^2)_2SiO$ units, where the $R^1+R^2+H$ to Si ratio can vary from 1.2 to 2.7, where $R^1$ and $R^2$ are $C_{(1-13)}$ monovalent organic radicals free of olefinic unsaturation and can be selected from R radicals.

The polyhydroorganosiloxane resins can be made by hydrolyzing the corresponding hydride chlorosilanes in the presence of an organic hydrocarbon solvent. To prepare resins having only monofunctional $(R^1)_3SiO_{0.5}$ units and tetrafunctional $SiO_2$ units, there can be cohydrolyzed a hydrogen diorganochlorosilane and tetrachlorosilane. Resins having monofunctional siloxy units, difunctional siloxy units, and tetrafunctional siloxy units, can be obtained by hydrolyzing a hydrogendiorganochlorosilane, tetrachlorosilane and a diorganodichlorosilane at particular ratios. Additional polyhydroorganosiloxane resins are shown by Jeram, U.S. Pat. No. 4,040,101 which is incorporated herein by reference.

The polyhydroorganosiloxane also can include linear organopolysiloxane having the formula,

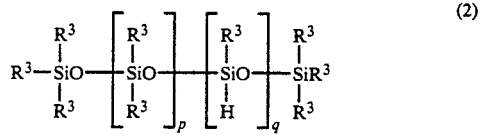

(2)

where $R^3$ is the same or different $C_{(1-13)}$ monovalent organic radical free of olefinic unsaturation, and p and q are integers having values sufficient to provide a polymer having a viscosity of from 1 to 1,000 centipoises at 25° C., and wherein the polysiloxane has from 0.04 to 1.4 by weight of hydrogen. The polyhydroorganosiloxane of formula (2) can be produced by equilibrating the appropriate hydrogencyclopolysiloxane with the appropriate cyclopolysiloxane containing $R^3$ substituent groups, in combination with low molecular weight linear triorganosiloxane chainstoppers.

In formulas (1) and (2), and the above polyhydroorganosiloxane resins, the chemically combined units can have R, $R^1$, $R^2$ and $R^3$ radicals, which can be the same or different and are selected from alkyl radicals having from 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The polyhydroorganosiloxane of formula (2) is prepared by either a hydrolysis process or by an acid catalyzed equilibration process. In the equilibration process, cyclopolysiloxane is equilibrated with a low molecular weight hydrogen terminated chainstopper, such as a dihydrogentetraorganodisiloxane. The acid catalyzed equilibration reaction is similar to the method used for the production of the vinyl containing base polymer. In the hydrolysis process, hydrogendiorganochlorosilane is hydrolyzed with diorganodichlorosilanes to produce the polymer of formula (2). The resulting siloxane hydride can be separated from undesirable cyclics by stripping.

Some of the aliphatic alcohols which can be reacted with the polyhydroorganosiloxane in accordance with the practice of the present invention are, for example, benzyl alcohol, methyl alcohol, ethyl alcohol, and propyl alcohol. Also ethylene glycol and other polyols can be used.

Alkali metal alkoxide catalysts which can be used to catalyze the reaction between the above alphatic alcohols and the polyhydroorganosiloxane can be made by effecting reaction between an alkali metal, such as sodium, potassium, lithium, etc, and an aliphatic alcohol as defined above. There can be used $1 \times 10^{-6}$ to 1 mols of alkali metal, per mole of alcohol. Transition metal oxide which can be utilized in the practice of the present invention in combination with a polyhydrogenorganosiloxane are, for example, $RuO_2$, $OsO$, $OsO_2$, $RhO$, $Rh_2O_3$, $RhO_2$, $IrO$, $Ir_2O_3$, $IrO_2$, $PdO$, $PdO_2$, $PtO_2$ and $Pt_3O_4$.

In the practice of the present invention, a blend of the aromatic polyester or polyester and the polyhydroorganosiloxane, which hereinafter also means the reaction product of the polyhydroorganosiloxane with the aliphatic alcohol and the blend of the polyhydroorganosiloxane, and the transition metal oxide, as defined in the Statement of the Invention, can be made in most instances by physically mixing the ingredients and thereafter molding the resulting product. The polyhydroorganosiloxane, for example, can be a fluid or a granulated resinous solid, and the polyester can be generally in granulated form. A proportion of from 0.1 parts to 100 parts by weight of the polyhydroorganosiloxane, per 100 parts by weight of the polyester can be used to provide effective results, while preferably from 1 parts to 30 parts by weight of polyhydroorganosiloxane can be used. Molding of the blend can be achieved at temperatures in the range of from 240° C. to 260° C. and at pressures of from 2000 psi to 8000 psi for 60 to 120 seconds.

In instances where the polyhydroorganosiloxane is not completely miscible with the polyester, an inert organic solvent can be used to facilitate dispersing the polyhydroorganosiloxane in the polyester prior to molding or extrusion. Suitable organic solvents are, for example, toluene.

In order that those skilled in the art will be better able to practice the present invention, the following examples are given by way of illustration and not by way of limitation. All parts are by weight unless otherwise indicated.

EXAMPLE 1

A blend of 2.3 grams of a polyhydromethylsiloxane fluid consisting essentially of about 74 to 82 condensed siloxy units and about 1.7% by weight of hydrogen and a viscosity of from about 85 centipoise at 25° C. was blended with 23 grams of a granulated polybutylene terephthalate having a number average molecular weight of about 40,000 and a weight average M.W. of about 80,000 which is commercially available as Valox ® polyester resin. It was found that the polyester resin had an initial drip time of about 2 seconds, when a 5"×½"×⅛" sample was tested in accordance with the procedure as shown by the flammability of Plastic Materials Bulletin of Jan. 24, 1980. The test bar was suspended vertically over a ¾ inch Bunsen burner flame. However, when the polyhydromethylsiloxane-polyester blend was tested following the same procedure, it had a drip time of about 16 seconds.

EXAMPLE 2

Three grams of the polyhydromethylsiloxane of Example 1, was dissolved in 5 ml of toluene. There was added to the solution, 0.3 ml of basic benzyl alcohol which was prepared by adding 43 milligrams of sodium metal to 5 ml of benzyl alcohol. Gas evolution resulted as soon as the basic benzyl alcohol was added to the polyhydromethylsiloxane solution. After the gas evolution has subsided, the solution was heated to reflux and then cooled. The resulting mixture was added to a suspension of 30 grams of the polybutylene terephthalate of Example 1 in 300 ml of toluene. The toluene was then removed using a Rotovap. The product was then dried in a vacuum oven for 12 hours at 160° C. Twenty-three grams of product was compression molded at 250° C. for 90 seconds at 2 tons of pressure. In accordance with the flammability procedure of Example 1, the sample dripped after 44 seconds. A control containing only the sodium salt of benzyl alcohol free of the polyhydromethylsiloxane, had a drip time of about 2 seconds.

EXAMPLE 3

A test slab was prepared in accordance with the procedure of Example 1, utilizing a mixture of 2.3 grams of a polyhydromethylsiloxane fluid having a viscosity of about 85 centipoises and consisting essentially of condensed methylhydrogensiloxy units and dimethylsiloxy units having about 1.7% by weight of active hydrogen, 5 mg of platinum oxide and 23 grams of the polybutylene terephthalate of Example 1. The mixture was molded into a test slab utilizing a pressure of one ton at 250° C. for 90 seconds. The resulting sample was found to have a drip time of about 44 seconds.

Although the above examples are directed to only a few of the very many variables which can be used in the practice of the present invention, it should be understood that the present invention is directed to the use of a much broader variety of aromatic polyesters, polyhydroorganosiloxanes, aliphatic alcohols, and transition metal oxides as set forth in the description preceding these examples.

We claim:

1. Thermoplastic molding compositions exhibiting enhanced non-drip properties upon burning, which consists essentially of,
    (a) a linear aromatic polyester and
    (b) an effective amount of a non-drip additive in the form of a reaction product of a polyhydroorganosiloxane and 0.1% to 50% by weight based on the weight of the polyhydroorganosiloxane of an aliphatic alcohol catalyzed by an alkali metal alkoxide.

2. Thermoplastic molding composition in accordance with claim 1, the polyhydroorganosiloxane is a polyhydromethylsiloxane.

3. Thermoplastic molding composition in accordance with claim 1, where the alkali metal alkoxide is a sodium salt of benzyl alcohol.

4. Thermoplastic molding compositions in accordance with claim 1, where the linear aromatic polyester is polybutylene terephthalate.

5. Thermoplastic molding compositions in accordance with claim 1, where the linear polyester is polyethylene terephthalate.

* * * * *